(12) United States Patent
Tomokane

(10) Patent No.: US 11,657,544 B2
(45) Date of Patent: May 23, 2023

(54) INFORMATION PROCESSING APPARATUS AND NON-TRANSITORY COMPUTER READABLE MEDIUM

(71) Applicant: FUJIFILM Business Innovation Corp., Tokyo (JP)

(72) Inventor: Hideyuki Tomokane, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 0 days.

(21) Appl. No.: 17/315,961

(22) Filed: May 10, 2021

(65) Prior Publication Data
US 2022/0189073 A1 Jun. 16, 2022

(30) Foreign Application Priority Data
Dec. 14, 2020 (JP) .............................. JP2020-206448

(51) Int. Cl.
*G06T 11/00* (2006.01)
*G06F 3/0482* (2013.01)

(52) U.S. Cl.
CPC ............ *G06T 11/00* (2013.01); *G06F 3/0482* (2013.01); *G06T 2200/24* (2013.01)

(58) Field of Classification Search
None
See application file for complete search history.

(56) References Cited

U.S. PATENT DOCUMENTS

2014/0263578 A1* 9/2014 Youngquist ........... G06T 7/0004
228/103
2020/0402266 A1* 12/2020 Kawamoto ............. G06T 11/00
2021/0281811 A1* 9/2021 Ueda ..................... G06T 1/0007

FOREIGN PATENT DOCUMENTS

JP H06-231206 A 8/1994

* cited by examiner

*Primary Examiner* — Yi Wang
(74) *Attorney, Agent, or Firm* — Oliff PLC

(57) ABSTRACT

An information processing apparatus includes: a processor configured to: if a part of a designated wiring or a designated component is arranged in an invisible wiring layer of a printed wiring board other than a currently visible wiring layer of the printed wiring board when superimposing and displaying, on a captured image of the printed wiring board, information related to the component or wiring which has been designated from among plural components and plural wirings arranged on the printed wiring board, display information related to the part of the designated wiring or the designated component on the currently visible wiring layer.

12 Claims, 18 Drawing Sheets

FIG. 9

| ARRANGEMENT INFORMATION EXAMPLE | | |
|---|---|---|
| IC101, X DISTANCE FROM REFERENCE POINT, Y DISTANCE FROM REFERENCE POINT, X LENGTH, Y LENGTH, Z LENGTH, LAYER NUMBER, COMPONENT NAME | IC102, X DISTANCE FROM REFERENCE POINT, Y DISTANCE FROM REFERENCE POINT, X LENGTH, Y LENGTH, Z LENGTH, LAYER NUMBER, COMPONENT NAME | ･･･････ | P81, PIN1 OF IC101, PIN1 OF IC102, 4 (NUMBER OF WIRING PATTERNS) LINEAR PATTERN P81-1: X DISTANCE FROM REFERENCE POINT FOR START POINT, Y DISTANCE FROM REFERENCE POINT FOR START POINT, X DISTANCE FROM REFERENCE POINT FOR END POINT, Y DISTANCE FROM REFERENCE POINT FOR END POINT, LAYER NUMBER, LINE WIDTH LINEAR PATTERN P81-2: X DISTANCE FROM REFERENCE POINT FOR START POINT, Y DISTANCE FROM REFERENCE POINT FOR START POINT, X DISTANCE FROM REFERENCE POINT FOR END POINT, Y DISTANCE FROM REFERENCE POINT FOR END POINT, LAYER NUMBER, LINE WIDTH LINEAR PATTERN P81-3: X DISTANCE FROM REFERENCE POINT FOR START POINT, Y DISTANCE FROM REFERENCE POINT FOR START POINT, X DISTANCE FROM REFERENCE POINT FOR END POINT, Y DISTANCE FROM REFERENCE POINT FOR END POINT, LAYER NUMBER, LINE WIDTH LINEAR PATTERN P81-4: X DISTANCE FROM REFERENCE POINT FOR START POINT, Y DISTANCE FROM REFERENCE POINT FOR START POINT, X DISTANCE FROM REFERENCE POINT FOR END POINT, Y DISTANCE FROM REFERENCE POINT FOR END POINT, LAYER NUMBER, LINE WIDTH | ･･･････ |

AR DISPLAY EXAMPLE
(WHEN HIGHLIGHTING ONLY COMPONENTS AND WIRING PATTERNS ON CURRENTLY INVISIBLE LAYER IS SELECTED)

INFORMATION PROCESSING APPARATUS AND NON-TRANSITORY COMPUTER READABLE MEDIUM

CROSS-REFERENCE TO RELATED APPLICATIONS

This application is based on and claims priority under 35 USC 119 from Japanese Patent Application No. 2020-206448 filed Dec. 14, 2020.

BACKGROUND

(i) Technical Field

The disclosure relates to an information processing apparatus and a non-transitory computer readable medium.

(ii) Related Art

JP-A-6-231206 describes a computer-aided design (CAD) output device that facilitates a spatial recognition of circuit patterns by displaying circuit patterns of the front and back of a circuit board on the front and back of a double-sided display.

SUMMARY

Aspects of non-limiting embodiments of the present disclosure relate to an information processing apparatus and a non-transitory computer readable medium capable of enable a user to know a position of a component or wiring that is not directly visible when superimposing and displaying information related to a designated component or wiring on an captured image of a printed wiring board including plural wiring layers.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided an information processing apparatus including: a processor configured to: if a part of a designated wiring or a designated component is arranged in an invisible wiring layer of a printed wiring board other than a currently visible wiring layer of the printed wiring board when superimposing and displaying, on a captured image of the printed wiring board, information related to the component or wiring which has been designated from among plural components and plural wirings arranged on the printed wiring board, display information related to the part of the designated wiring or the designated component on the currently visible wiring layer.

BRIEF DESCRIPTION OF THE DRAWINGS

Exemplary embodiment(s) of the present disclosure will be described in detail based on the following figures, wherein:

FIG. 9 is a diagram illustrating an example of arrangement information stored in an arrangement information storage 35;

DETAILED DESCRIPTION

An exemplary embodiment of the present disclosure will be described in detail with reference to the drawings.

Figure 1:
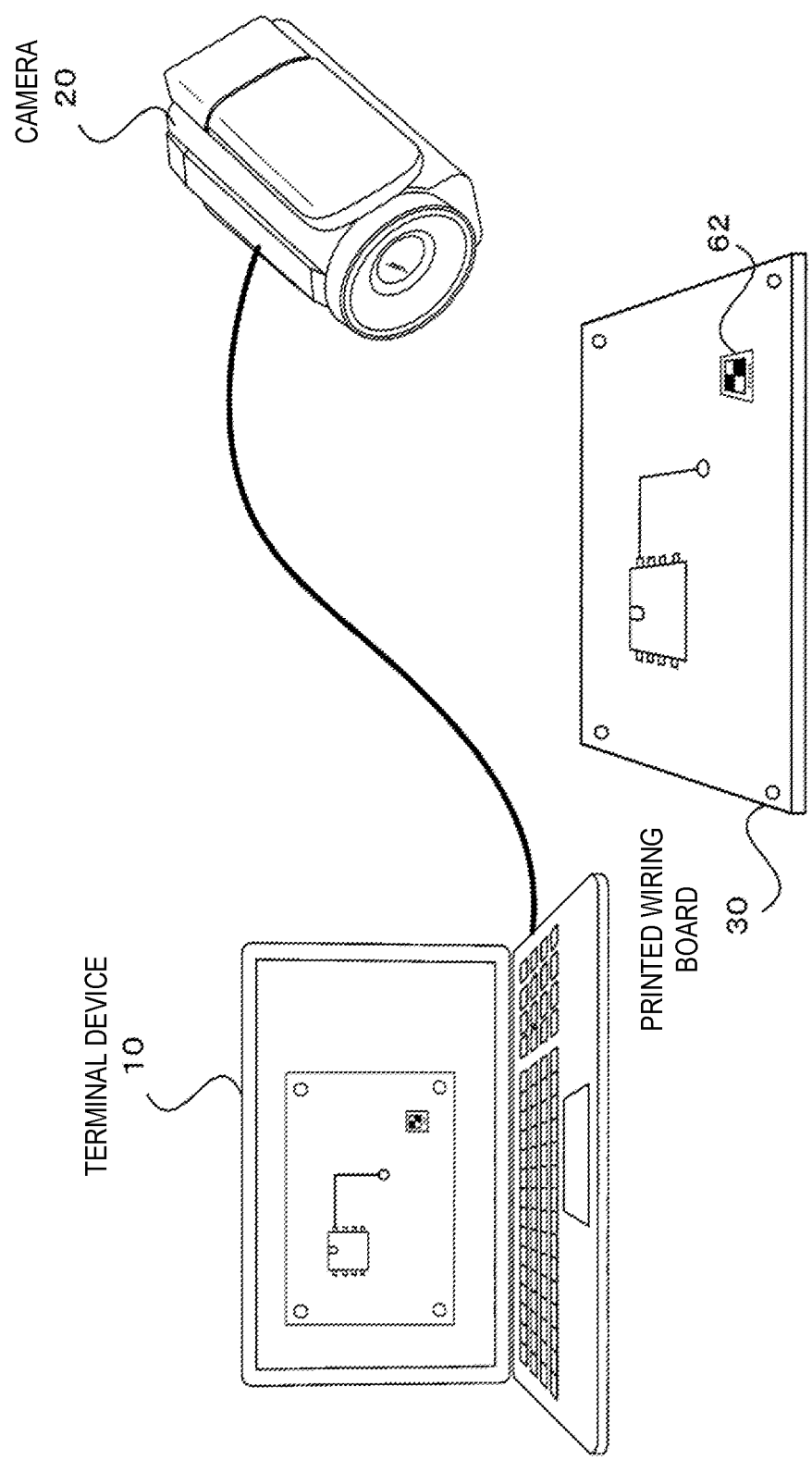
FIG. 1 is a diagram illustrating a system configuration of an information processing system according to an exemplary embodiment of the present disclosure.

FIG. 1 is a diagram illustrating the configuration of an information processing system according to the exemplary embodiment of the present disclosure.

The information processing system of the present exemplary embodiment includes a camera 20 that captures a printed wiring board 30 provided with a marker 62 for specifying a reference position and a terminal device 10 that stores the arrangement information of the components mounted on the printed wiring board 30 and the wiring patterns connecting the components.

In recent years, the area of a printed wiring board built in an electronic device tended to become smaller, and the mounting density of components has been increasing. In the past, information such as a component number of a component to be mounted is shown on the printed wiring board by, for example, a silk printing, but there is no space for the silk printing on the printed wiring board. Further, even when information such as the component number may be printed, the information to be printed needs to be omitted or the characters needs to be decreased. Thus, sufficient information may not be obtained directly from the printed wiring board.

Therefore, the information processing system of the present exemplary embodiment captures the printed wiring board 30 by the camera 20, and superimposes and displays, on the captured image of the printed wiring board 30 on the display of the terminal device 10, information related to the component or wiring pattern designated from among the plural components and wiring patterns arranged on the printed wiring board 30.

Specifically, in the information processing system of the present exemplary embodiment, the image of the printed wiring board 30 captured by the camera 20 is displayed on the display of the terminal device 10, and component information such as component numbers and component types and wiring information indicating the wiring pattern that connects between specific terminals of a specific component are displayed in an augmented reality (AR) manner on the displayed image of the printed wiring board 30.

The terminal device 10 stores information on distances from the reference positions of components and wiring patterns mounted on the printed wiring board 30, and information on each of the components and wiring patterns. Then, the terminal device 10 has a function of detecting the position of the marker 62 from the captured image of the printed wiring board 30 and executing an arithmetic process for superimposing and displaying information related to the components and wiring patterns.

In the present exemplary embodiment, descriptions will be made on an example where the printed wiring board 30 is a so-called double-sided board in which wiring layers (or conductor layers) are provided on both sides of an insulating layer. It is noted that the present disclosure may be similarly applied to an example in which a multilayer board provided with three or more wiring layers.

Figure 2:
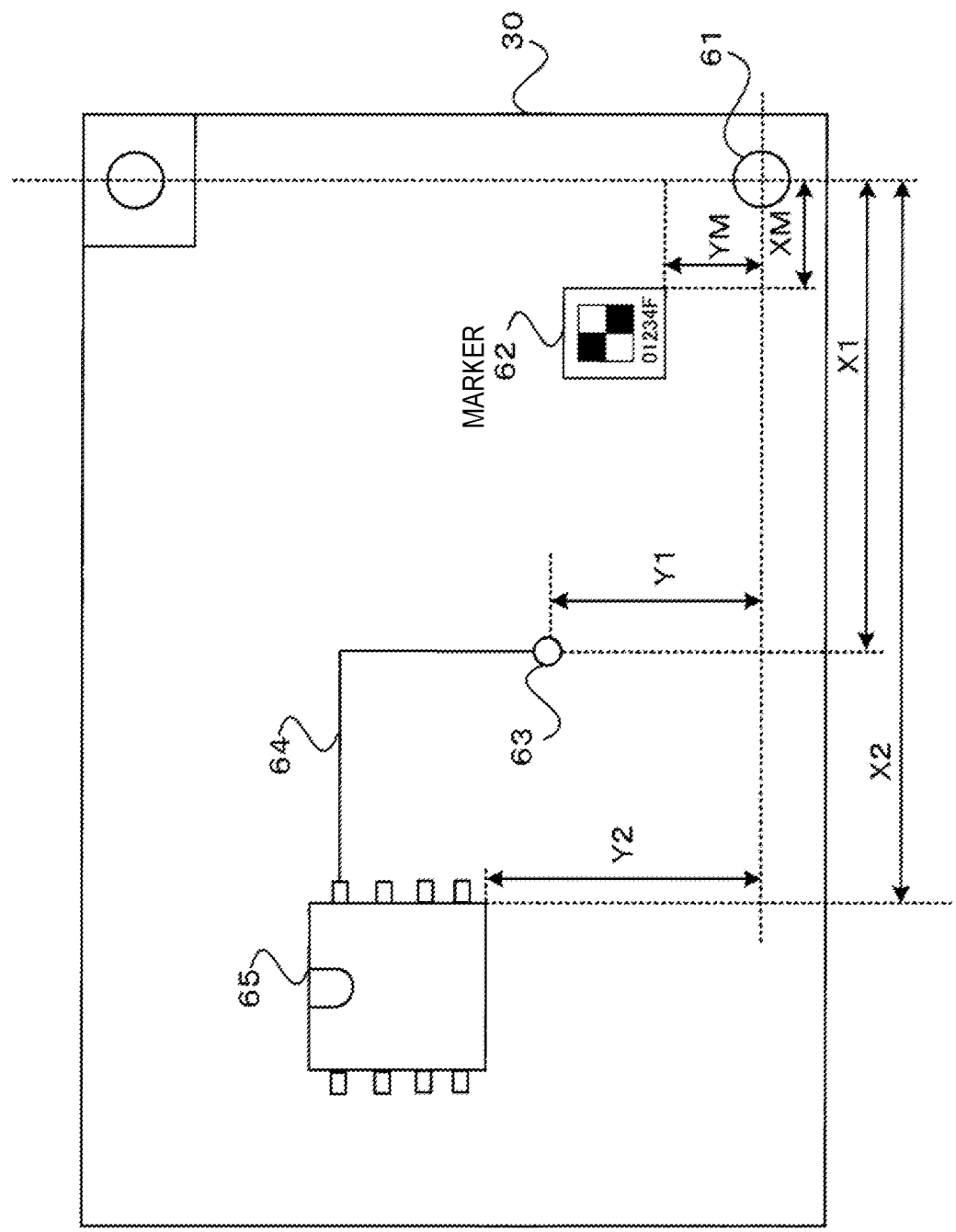
FIG. 2 is a diagram illustrating an example of a printed wiring board 30 illustrated in FIG. 1.

An example of the printed wiring board 30 in FIG. 1 is illustrated in FIG. 2. Referring to FIG. 2, a component 65 is mounted on the printed wiring board 30, and the terminal of the component 65 and a via hole 63 are connected to each other by the wiring pattern 64. Here, the via hole 63 is a through hole provided for electrically connecting plural layers. In the present exemplary embodiment, for the sake of simplicity, descriptions will be made on an example in which only one component 65 and one wiring pattern 64 are arranged on the front surface of the printed wiring board 30. It is noted that numerous components and numerous wiring patterns for connecting these components are actually mounted on the printed wiring board.

Referring to FIG. 2, the printed wiring board 30 is provided with a reference point 61 that is a design reference position. The positions of the via hole 63, the component 65, and the marker 62 are specified by the distance of the X coordinate and the distance of the Y coordinate from the reference point 61.

Figure 3:
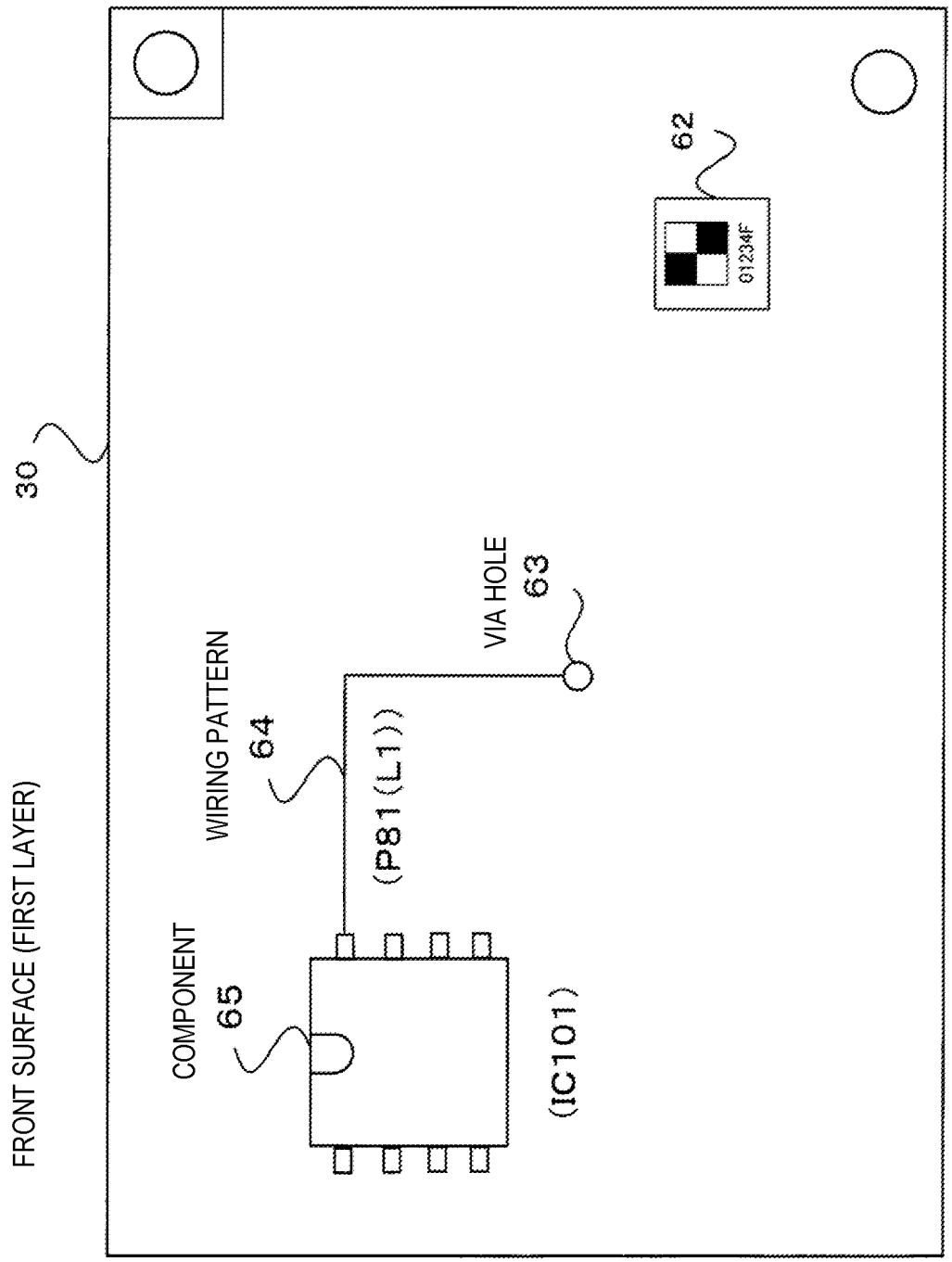
FIG. 3 is a diagram illustrating details of the printed wiring board 30 illustrated in FIG. 1 as viewed from the front surface.

The details of the printed wiring board 30 represented in this figure as viewed from the front surface are illustrated in FIG. 3. In the present exemplary embodiment, since the wiring layer of the printed wiring board 30 includes two layers, the front surface layer is referred to as a first layer, and the back surface layer is referred to as a second layer.

Referring to FIG. 3, the component 65 having a component number "IC101" is mounted on the front surface, which is the first layer of the printed wiring board 30, and the wiring pattern 64 having a wiring number "P81" and the via hole 63 are provided on the front surface.

Further, the marker 62 includes identification information for specifying the type and front or back surface of the printed wiring board. The marker 62 illustrated in FIG. 3 includes identification information of "01234F". Of this identification information, "01234" is information for specifying the type of the board, and "F" is an acronym for the front side, which stands for the front surface. On the back surface of the printed wiring board, identification information is provided in which "B", which is an acronym for the back side, which stands for the back surface, is added to the information for specifying the type of the board. That is, as illustrated in FIG. 4, a marker 66 called "01234B" is provided on the second layer, which is the back surface of the printed wiring board 30.

Figure 4:
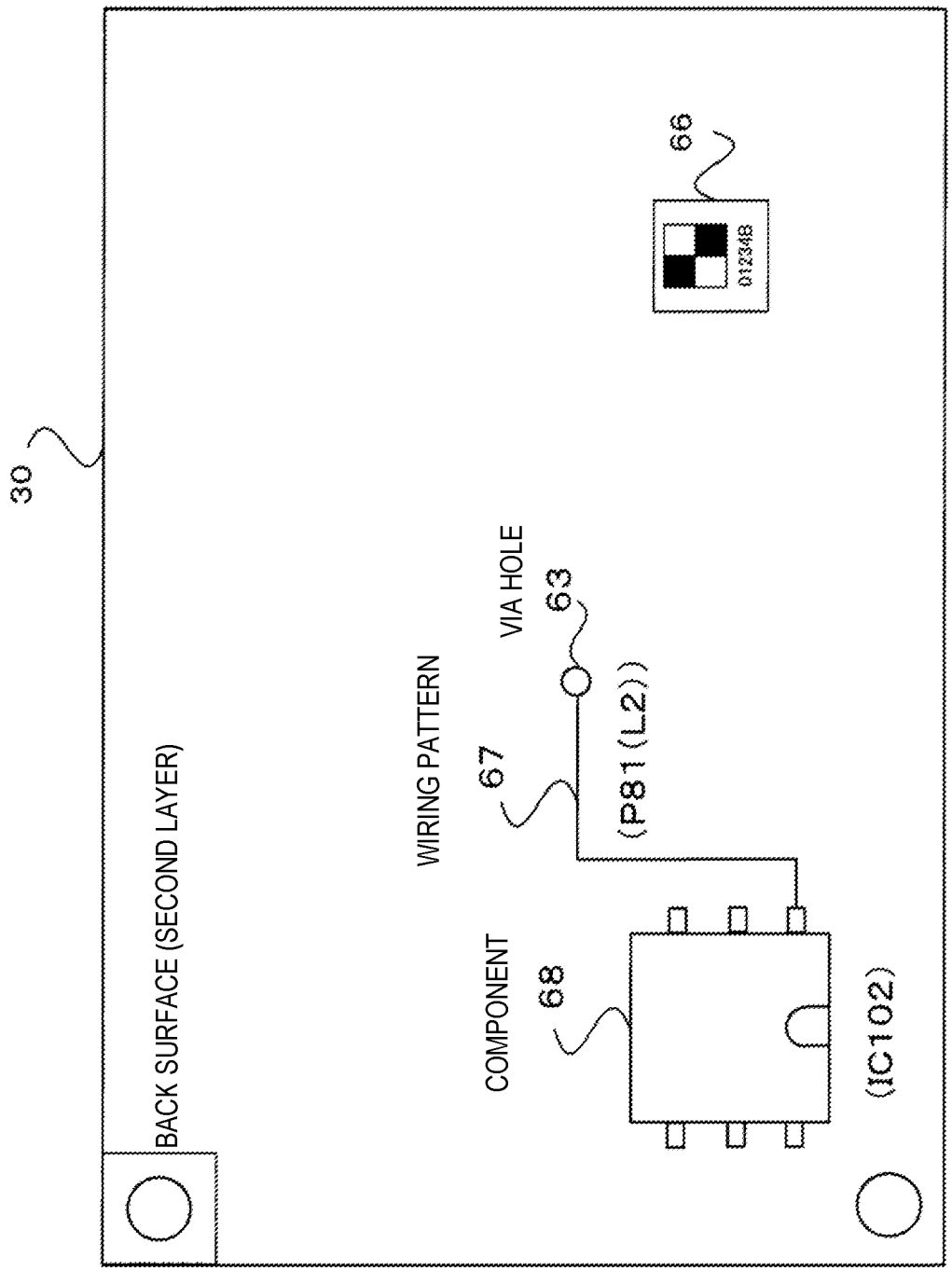
FIG. 4 is a diagram illustrating details of the printed wiring board 30 illustrated in FIG. 1 as viewed from the back surface.

Then, referring to FIG. 4, a component 68 having a component number "IC102" is mounted on the back surface, which is the second layer of the printed wiring board 30. A wiring pattern 67 having the wiring number "P81" and the via hole 63 are provided on the back surface.

Here, as for the wiring pattern having the wiring number "P81", the wiring pattern 64 on the front surface is given a wiring number "P81(L1)" and the wiring pattern 67 on the back surface is given a wiring number "P81(L2)".

In a printed wiring board such as a double-sided board or a multilayer board provided with such plural wiring layers, the wiring pattern is wired across the front surface layer, the back surface layer, or an inner layer. Therefore, when a defect occurs in a product using such a printed wiring board and the cause thereof is analyzed, it may be necessary to confirm the wiring pattern and the state of components over plural layers. However, by simply superimposing and displaying, on the captured image of the printed wiring board, only the information related to the components and wiring patterns on the visible layer, it is not possible to confirm that the wiring pattern is connected to a certain component in another layer via the via hole. In the case of attempting to confirm the wiring patterns or components of the back surface layer, it is necessary to turn over the printed wiring board and check it. Further, in the case of a multilayer board having an inner layer, it is not possible to confirm in which position the wiring pattern of the inner layer is arranged and what type of connection is made.

Figure 5:
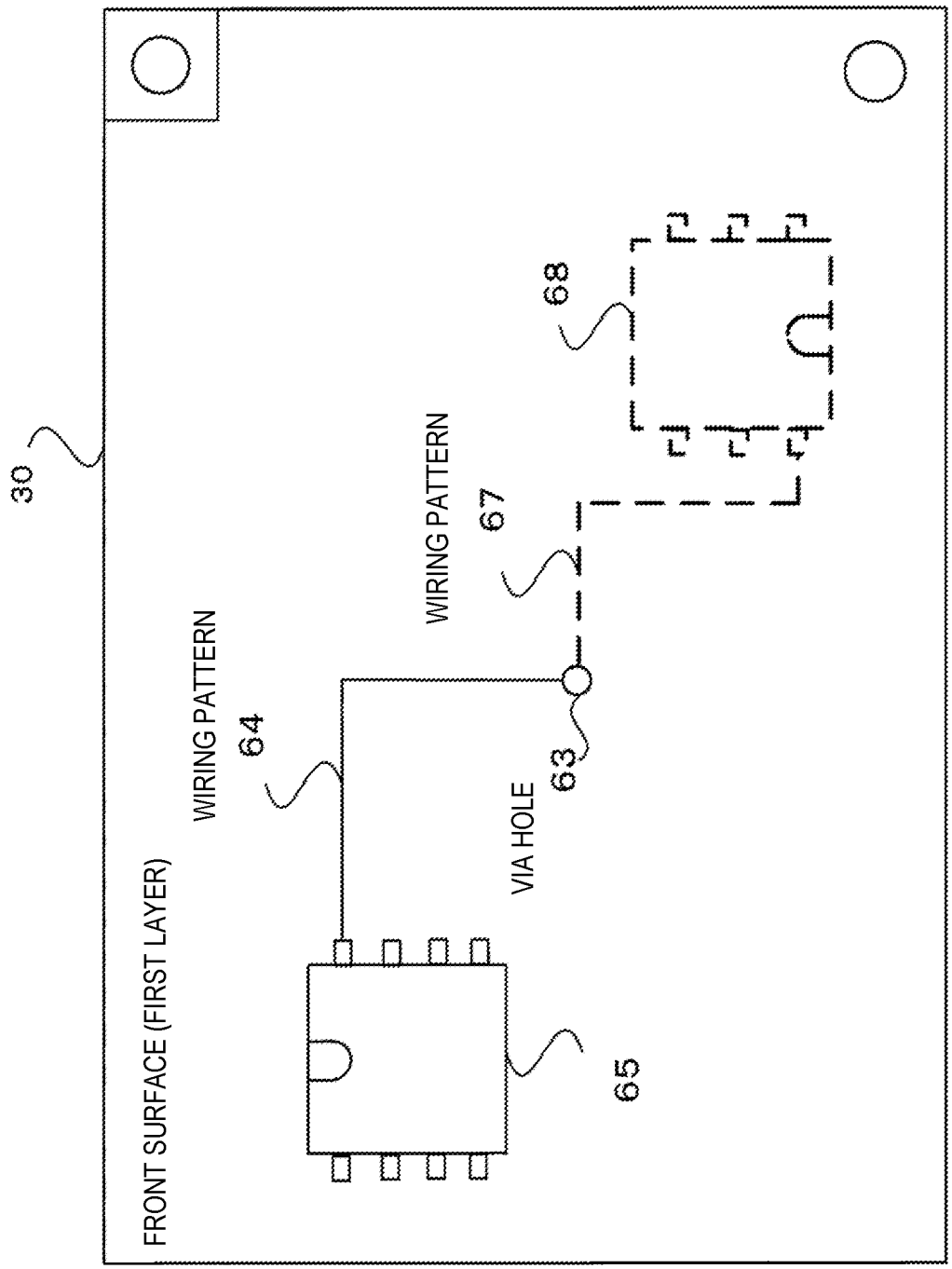
FIG. 5 is a diagram illustrating a state when the printed wiring board 30 illustrated in FIGS. 3 and 4 is seen through from the front surface.

For example, FIG. 5 illustrates a state when the printed wiring board 30 represented in FIGS. 3 and 4 is seen through from the front surface. In FIG. 5, the illustration of markers 62 and 66 is omitted for the sake of clarity.

Figure 6:
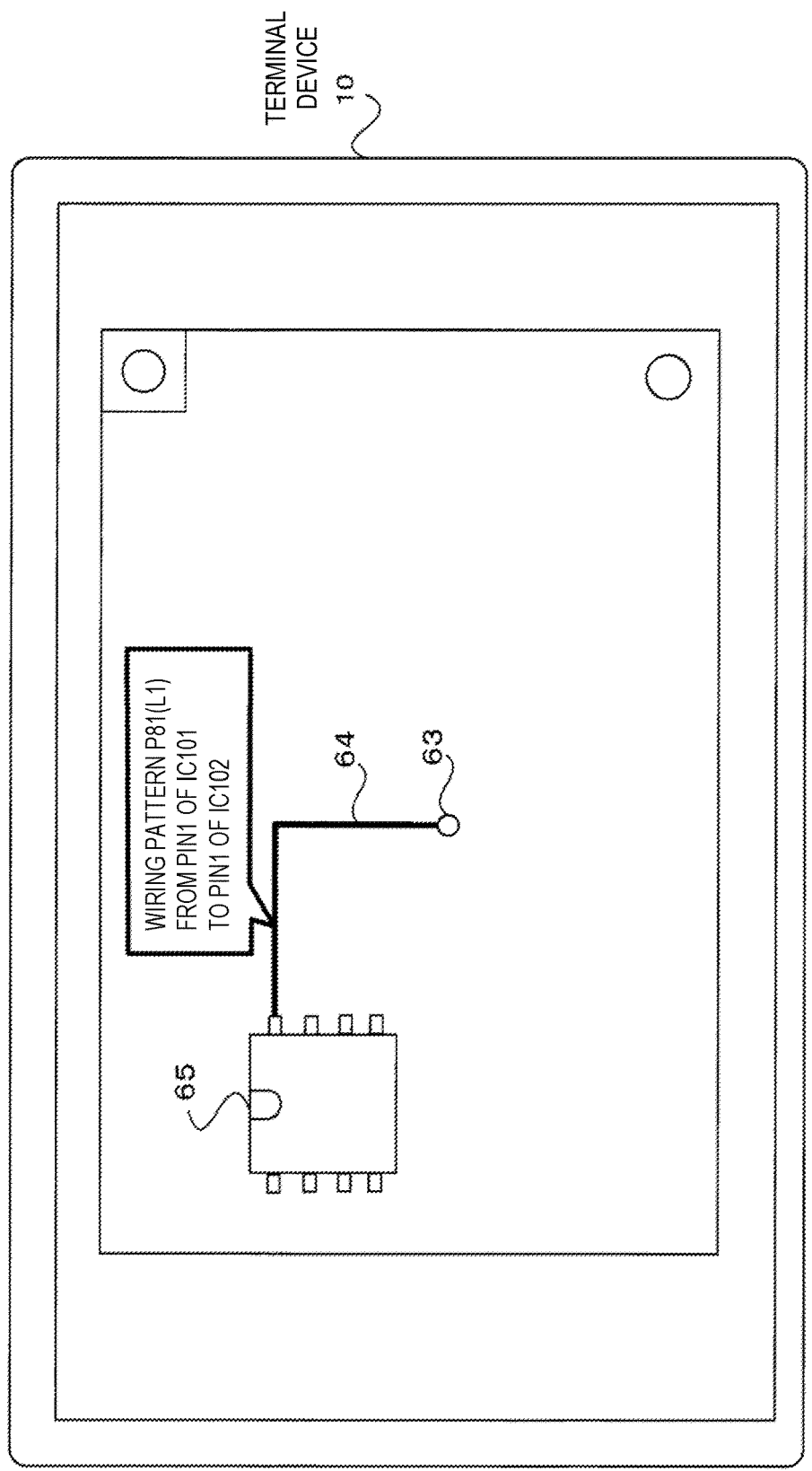
FIG. 6 is a diagram illustrating an example in which only a wiring pattern 64 arranged on the front surface is displayed in an AR manner when the printed wiring board 30 is captured from the front surface and displayed in the AR manner.

As may be seen with reference to FIG. 5, when the printed wiring board 30 is viewed from the front surface, a user may not see the wiring pattern 67 and the component 68 arranged on the back surface, and may not know the positions and shapes thereof. Therefore, as illustrated in FIG. 6, if only the wiring pattern having the wiring number "P81(L1)"

arranged on the front surface is displayed in the AR manner when the printed wiring board 30 is captured from the front surface and the display is performed in the AR manner, the user may not know the type of connection that is made before the via hole 63.

Therefore, with the following configuration, if a part of a designated wiring or a designated component is arranged in a wiring layer other than a currently visible wiring layer of a printed wiring board when superimposing and displaying, on a captured image of the printed wiring board, information related to the component or wiring which has been designated from among a plurality of components and a plurality of wirings arranged on the printed wiring board, the information processing system of the present exemplary embodiment displays information related to the part of the designated wiring or the designated component on the currently visible wiring layer.

Figure 7:
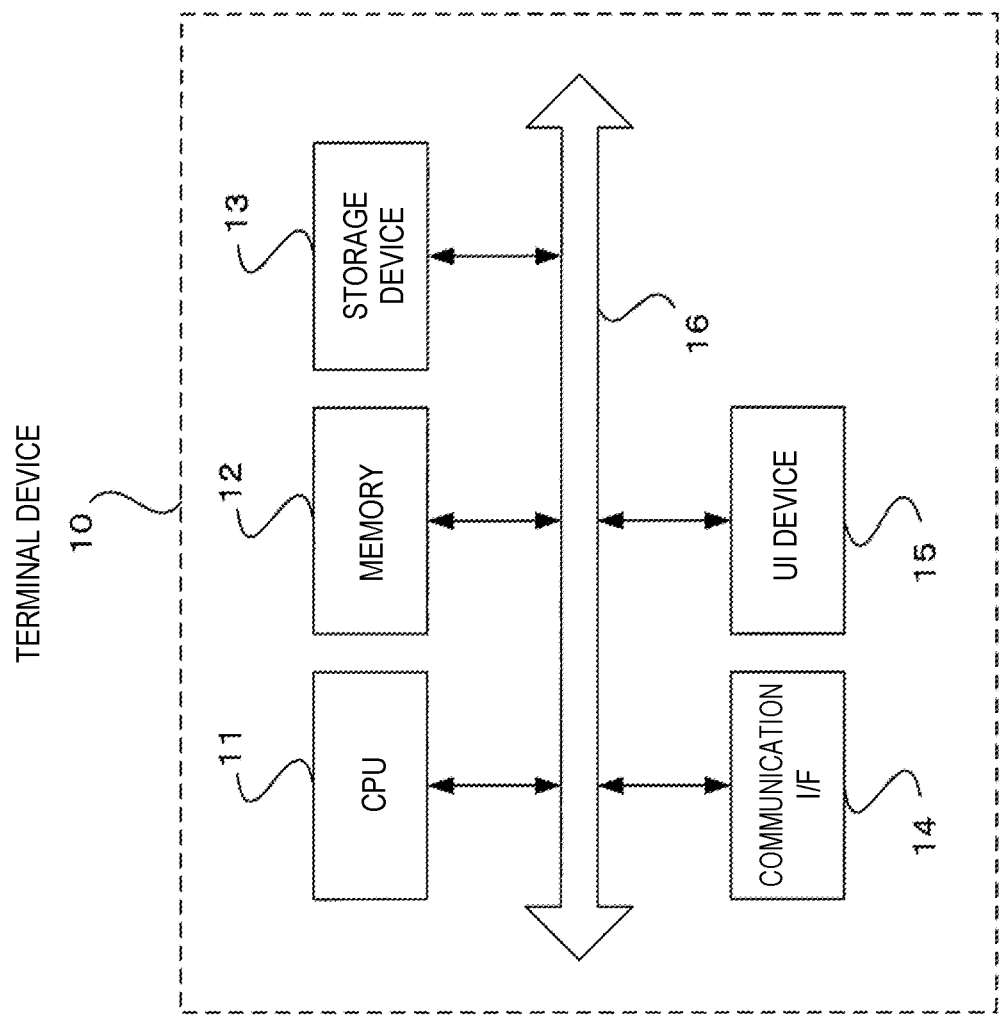
FIG. 7 is a block diagram illustrating a hardware configuration of a terminal device 10 according to the exemplary embodiment of the present disclosure.

Next, FIG. 7 illustrates the hardware configuration of the terminal device 10 in the information processing system of the present exemplary embodiment.

As illustrated in FIG. 7, the terminal device 10 includes a CPU 11, a memory 12, a storage device 13 such as a hard disk drive, a communication interface (abbreviated as "IF") 14 that transmits and receives data to and from an external device via a network, and a user interface (abbreviated as "UI") device 15 including a touch panel or a liquid crystal display and a keyboard. These elements are connected to each other via a control bus 16.

The CPU 11 is a processor that controls the operation of the terminal device 10 by executing a predetermined process based on a control program stored in the memory 12 or the storage device 13. What will be described in the present exemplary embodiment is an example in which the CPU 11 reads and executes the control program stored in the memory 12 or the storage device 13. It is noted that the program may be stored in a storage medium such as a CD-ROM and provide to the CPU 11.

Figure 8:
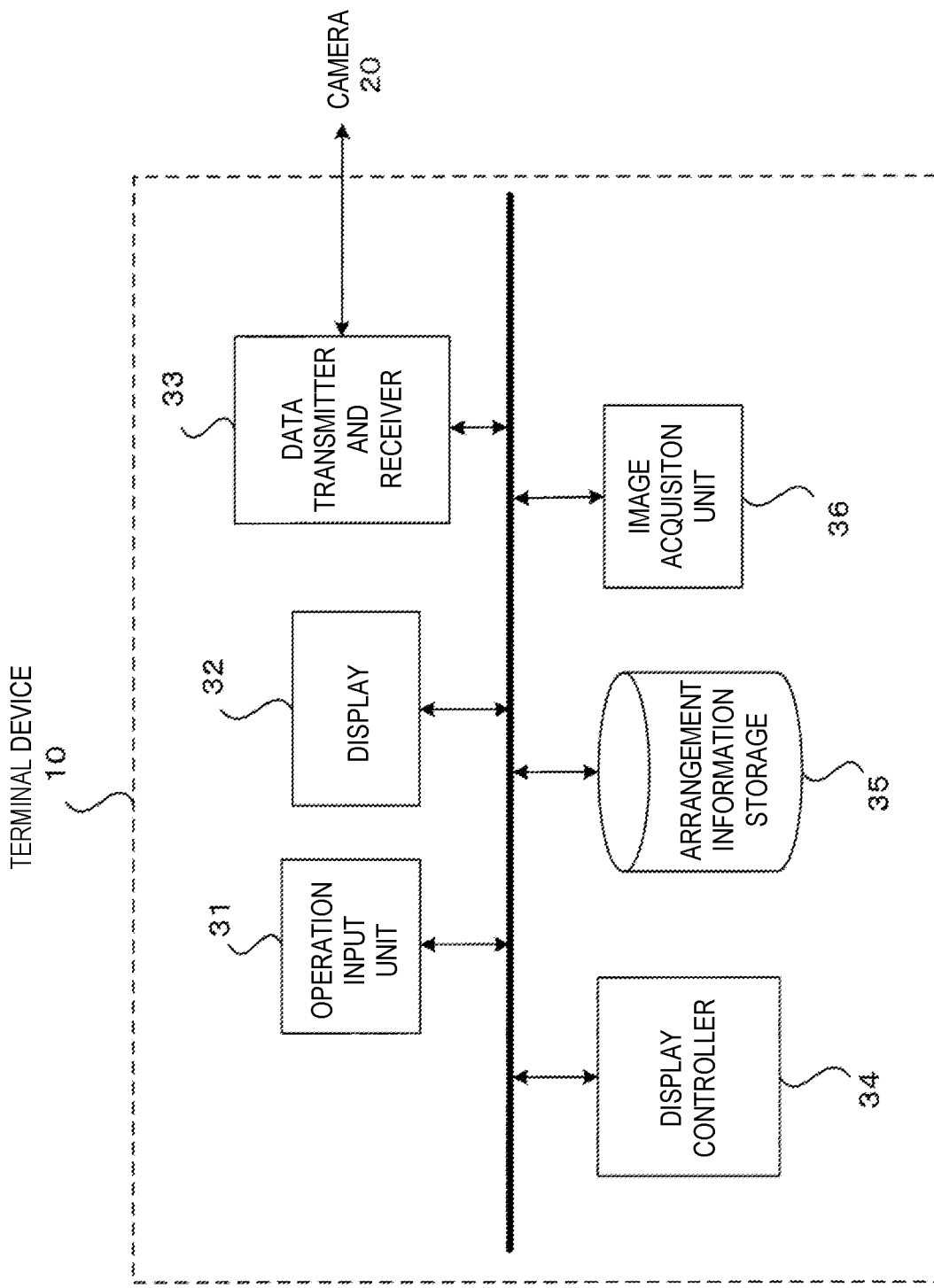
FIG. 8 is a block diagram illustrating a functional configuration of the terminal device 10 according to the exemplary embodiment of the present disclosure.

FIG. 8 is a block diagram illustrating a functional configuration of the terminal device 10 implemented by executing the above control program.

As illustrated in FIG. 8, the terminal device 10 of the present exemplary embodiment includes an operation input unit 31, a display 32, a data transmitter and receiver 33, a display controller 34, an arrangement information storage 35, and an image acquisition unit 36.

The operation input unit 31 inputs information on various operations performed by the user. The display 32 is controlled by the display controller 34 to display various information to the user.

The data transmitter and receiver 33 transmits and receives data to and from an external device such as a camera 20. The image acquisition unit 36 acquires an image obtained by capturing the printed wiring board 30 by the camera 20 via the data transmitter and receiver 33.

The arrangement information storage 35 stores arrangement information about the components mounted on the printed wiring board 30 and the arrangement positions of the wiring patterns connecting the terminals of the components. This arrangement information is generated by extracting only necessary information from the computer-aided design (CAD) design information file generated when designing the printed wiring board. Alternatively, the CAD design information file itself may be stored in the arrangement information storage 35 as arrangement information.

FIG. 9 illustrates an example of the arrangement information stored in the arrangement information storage 35.

The arrangement information represented in FIG. 8 is information obtained by extracting only the minimum necessary information from the CAD design information file. As for the components, the arrangement information stores, for each component, position information from the reference point 61, component number information, length information in the X-axis direction, Y-axis direction, and Z-axis direction, a layer number indicating in which layer of the front surface/back surface/inner layer of the printed wiring board such information exists, and information of the component name. Further, as for the wiring patterns, the arrangement information illustrated in FIG. 8 stores, for each wiring pattern, a wiring pattern number, information indicating that the wiring pattern connects what terminal of what component to what terminal of what component, the number of linear patterns, position information indicating a start point and end point of each linear pattern, a layer number, and line width information.

Here, description will be made on the assumption that the wiring pattern having the wiring number "P81" is arranged across the front surface, which is the first layer, and the back surface, which is the second layer. This wiring pattern includes four linear patterns of "P81-1", "P81-2", "P81-3", and "P81-4", the linear patterns of "P81-1" and "P81-2" are arranged on the front surface, and the linear patterns of "P81-3" and "P81-4" are arranged on the back surface.

The display controller 34 highlights the designated components and wiring patterns on the captured image of the printed wiring board 30 based on the arrangement information as illustrated in FIG. 9 and the relative position information of the marker 62 with respect to the reference point 61 of the printed wiring board 30, thereby improving the visibility of the designated component or wiring pattern. The display controller 34 also performs display in the AR manner, for example, superimposes (i) information on a component number or a wiring number that is an alternative to silk printing in the vicinity of the designated component or wiring pattern, (ii) a component name of a component, and (iii) connection information indicating how a wiring pattern connects, on the image of the printed wiring board 30.

As a method of designating a component or wiring pattern for display in the AR manner, a method of inputting a component number or wiring pattern number to the terminal device 10 may also be used.

Figure 10:
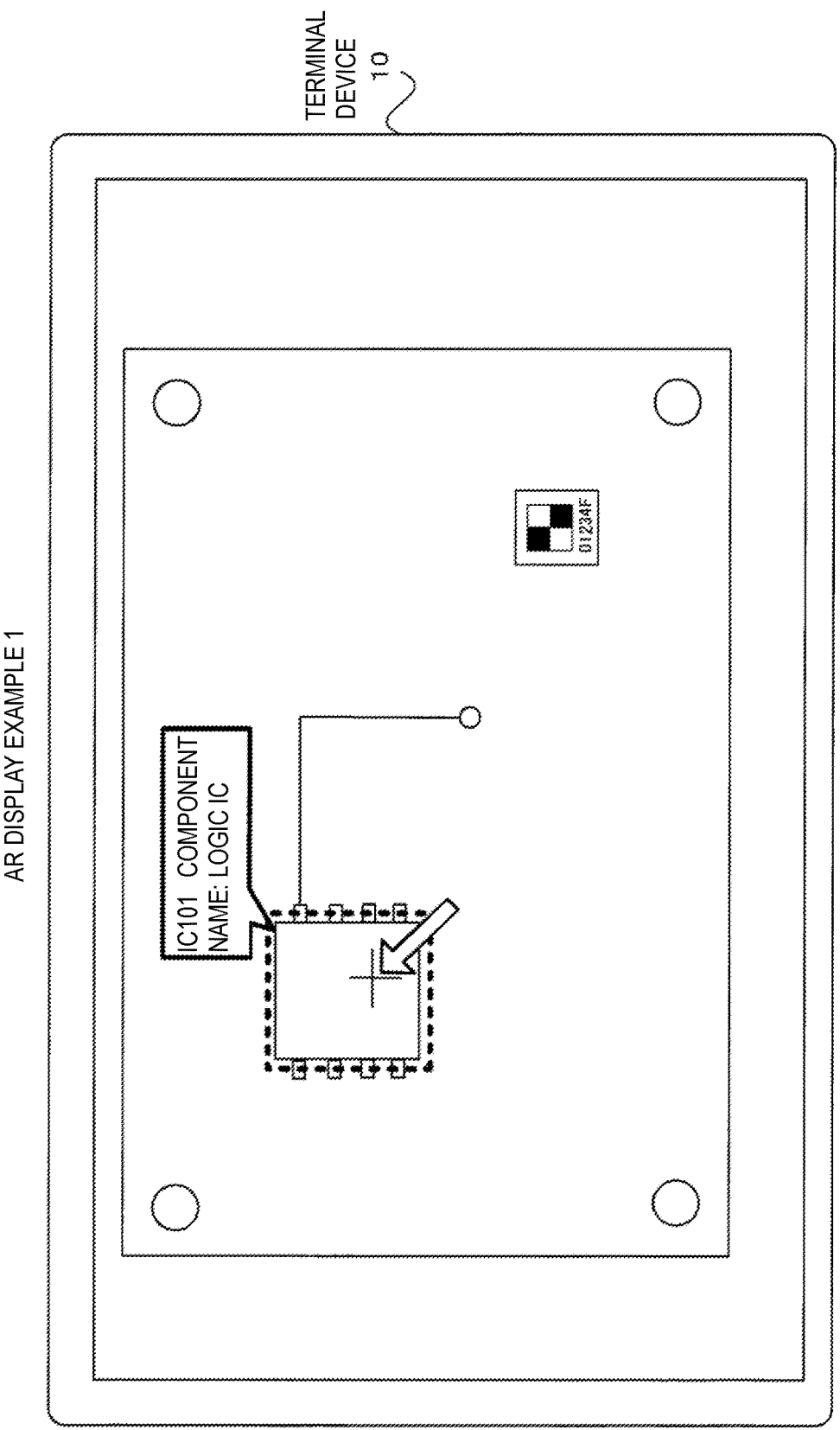
FIG. 10 is a diagram illustrating an AR display example in which display is performed in the AR manner in the terminal device 10 when a component is designated by a pointing device.

FIG. 10 illustrates a case where a component having the component number of IC101 is designated by a pointing device such as a mouse. A component having the component number of IC101 is highlighted by, for example, a thick red dotted line, and information on the component number "IC101" and information on the component name "logic IC" are displayed in a pop-up.

In this way, the display controller 34 performs display in the AR manner, that is, superimposes and displays, on the image obtained by capturing the printed wiring board 30 by the camera 20, information related to the component or wiring pattern designated from among the plural components and wiring patterns arranged on the printed wiring board 30.

Figure 11:
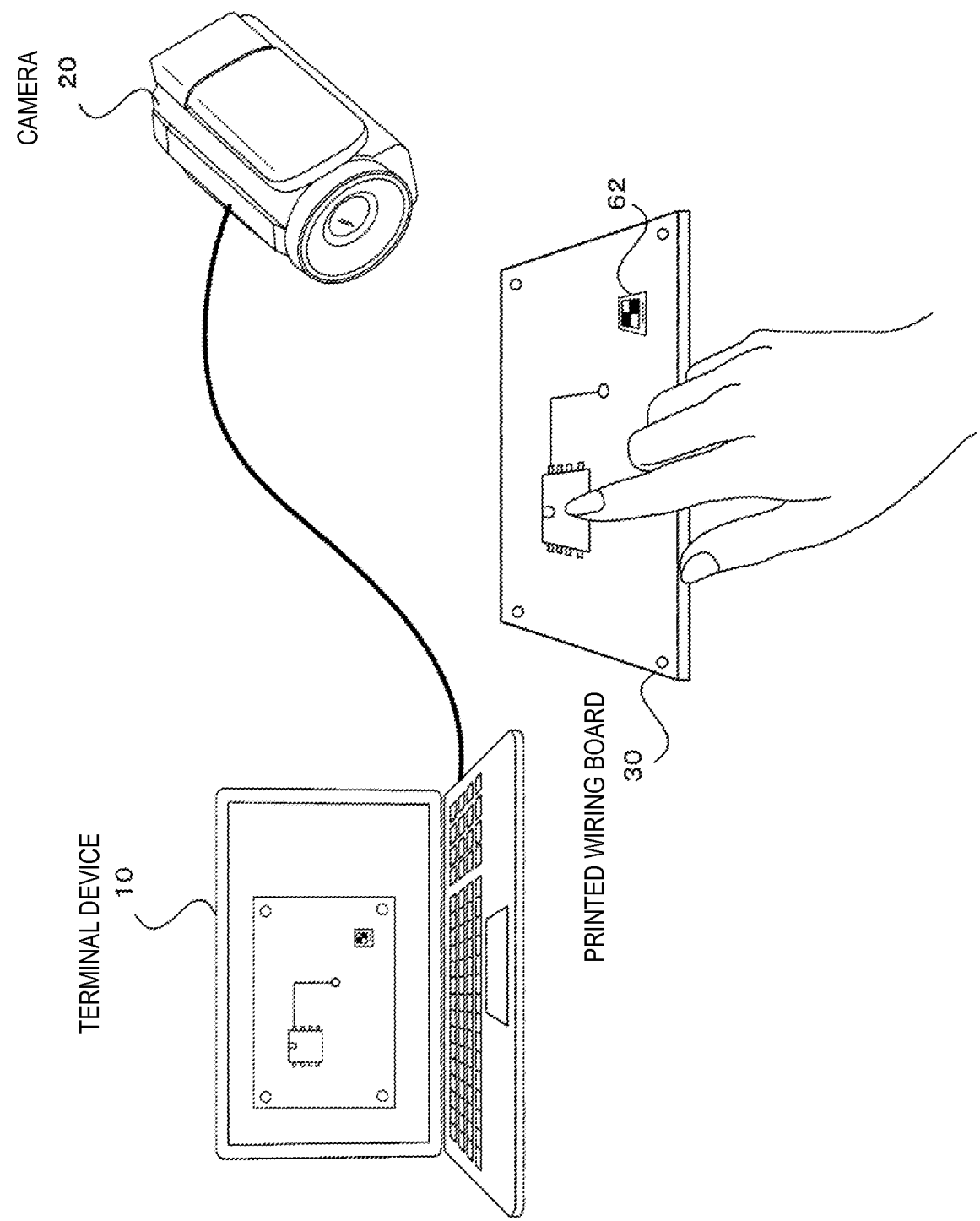
FIG. 11 is a diagram illustrating a state in which a user's finger points to a component on the printed wiring board 30.

Further, as illustrated in FIG. 11, it is possible to specify an object pointed to by a user's finger or a specific object such as a ballpoint pen on the printed wiring board 30 captured by the camera 20 by performing an image processing. It is also possible to use a designation method in which display is performed in the AR manner on the assumption that the specified component or wiring pattern is designated. When a component designated by the user's finger is specified in this way, the user's finger is detected in the image captured by the camera 20 by performing image processing, and the component pointed to by the detected finger is determined.

Figure 12:
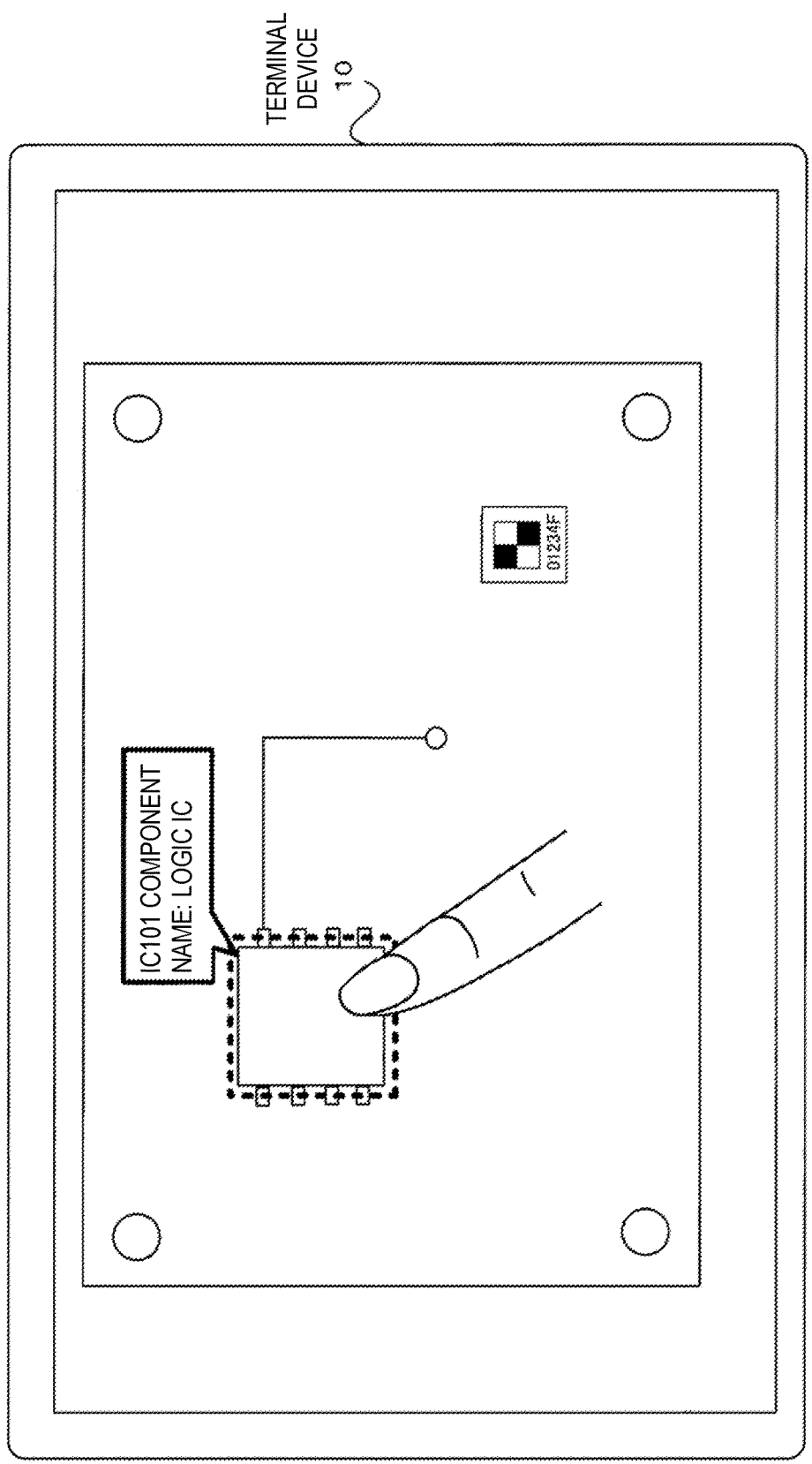
FIG. 12 is a diagram illustrating an AR display example in which display is performed in the AR manner in the terminal device 10 when a component is designated by the user's finger.

FIG. 12 illustrates an AR display example when the designated components are specified in this way. FIG. 12 illustrates a case where a component having the component number of IC101 is designated by a user's finger as in FIG. 10.

In this way, if a part of a designated wiring pattern or a designated component is arranged in an invisible wiring layer of a printed wiring board other than a currently visible wiring layer of the printed wiring board when performing display in the AR manner, that is, superimposing and displaying, on a captured image of the printed wiring board, information related to the component or wiring pattern which has been designated from among plural components and plural wiring patterns arranged on the printed wiring board, the display controller 34 displays information related to the part of the designated wiring pattern or the designated component on the currently visible wiring layer.

Specifically, the display controller 34 displays information indicating a shape and position of the part of the designated wiring pattern or the designated component, at the position thereof as if a wiring pattern and a component on the currently visible wiring layer are transparent.

For example, even when only the front surface layer of the printed wiring board 30 is currently visible, the display controller 34 superimposes and displays, on the image of the front surface of the printed wiring board 30, information related to the wiring patterns and components arranged on the back surface layer.

When the printed wiring board to be captured is a multilayer board, the display controller 34 superimposes and displays, on the currently visible wiring layer, information such as the shape and arrangement position of the wiring pattern arranged in the inner layer of the multilayer board.

When receiving, from a user, a designation of the component or wiring pattern whose related information is to be displayed on the captured image of the printed wiring board, the display controller 34 displays selectable options including (i) an option of displaying information related to both (a) a component or wiring pattern arranged on the visible wiring layer and (b) a component or wiring pattern arranged on the invisible wiring layer, and (ii) an option of displaying only the information related to the component or wiring pattern arranged on the invisible wiring layer. The display controller 34 switches the component or wiring whose related information is to be displayed on the captured image of the printed wiring board in accordance with an option selected by the user at that time.

Wiring hen superimposing and displaying, on the captured image of the printed wiring board, the information related to the component or wiring pattern arranged on the visible wiring layer, the display controller 34 displays the information related to the component or wiring pattern arranged on the visible wiring layer in a display mode different from a mode in which the information related to the component or wiring pattern arranged on the invisible wiring layer is displayed.

Specifically, the display controller 34 displays (i) the information related to the component or wiring pattern arranged on the visible wiring layer and (ii) the information related to the component or wiring pattern arranged on the invisible wiring layer, in different colors. More specifically, the display controller 34 displays the information related to the component or wiring pattern arranged on the visible wiring layer in blue and displays the information related to the component or wiring pattern arranged on the invisible wiring layer in red.

When superimposing and displaying, on the captured image of the printed wiring board, information related to plural components or plural wiring patterns arranged in plural invisible wiring layers, the display controller 34 displays information related to a component or wiring pattern arranged in one of the invisible wiring layers and information related to a component or wiring pattern arranged in another one of the invisible wiring layers in different display modes from each other.

For example, when performing display in the AR manner on an image of a multilayer board including first to fourth wiring layers, the display controller 34 displays information related to components or wiring patterns arranged on the first layer in black, information related to components or wiring patterns arranged on the second layer in red, information related to components or wiring patterns arranged on the third layer in blue, and information related to components or wiring patterns arranged on the fourth layer in yellow.

Next, the operation of the terminal device 10 in the present exemplary embodiment will be described in detail with reference to the drawings.

Figure 13:
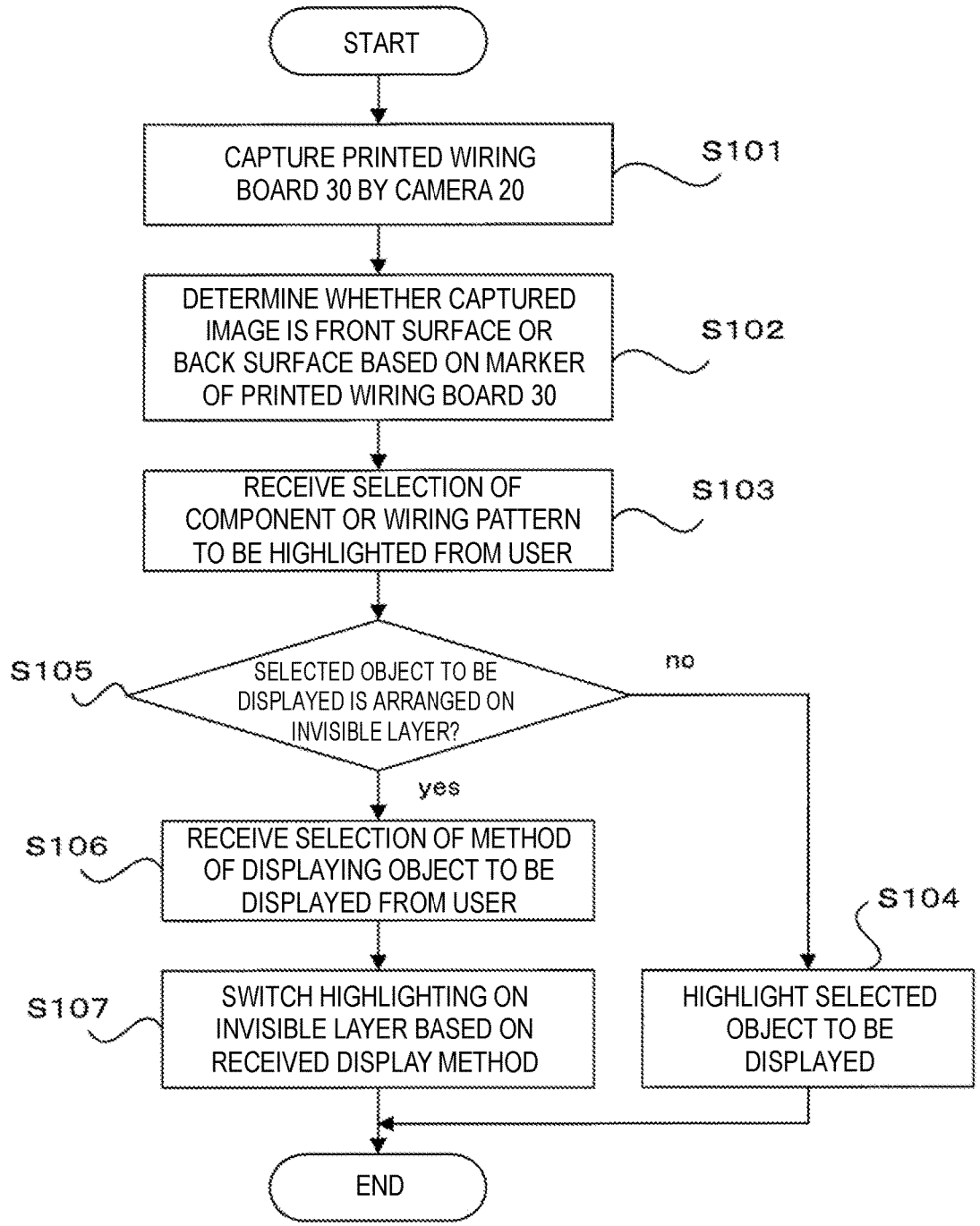
FIG. 13 is a flowchart illustrating the operation of the terminal device 10 when an image of the printed wiring board 30 is captured by a camera 20 and displayed in the AR manner.

First, with reference to the flowchart of FIG. 13, descriptions will be made on the operation of the terminal device 10 when the terminal device 10 captures the image of the printed wiring board 30 by the camera 20 and performs display in the AR manner.

First, in step S101, when the printed wiring board 30 is captured by the camera 20, the image acquisition unit 36 acquires the image of the printed wiring board 30 via the data transmitter and receiver 33.

Then, in step S102, the display controller 34 determines whether the captured image is the front surface or the back surface of the printed wiring board 30 based on the acquired marker of the printed wiring board 30.

Then, in step S103, the display controller 34 receives, from the user, the selection of the component or wiring pattern to be highlighted.

Next, in step S105, the display controller 34 determines whether the object to be displayed, which is the selected component or wiring pattern, is arranged on the currently invisible layer.

When it is determined in step S105 that the selected object to be displayed is arranged only on the visible layer, in step S104, the display controller 34 highlights the selected object to be displayed and displays, in the AR manner, related information such as the component number or wiring number of the object to be displayed on the image.

Then, when it is determined that the object to be displayed, which has been selected in step S105, is also arranged on the invisible layer, the display controller 34 receives the selection of the method of displaying the object to be displayed from the user in step S106.

Figure 14:
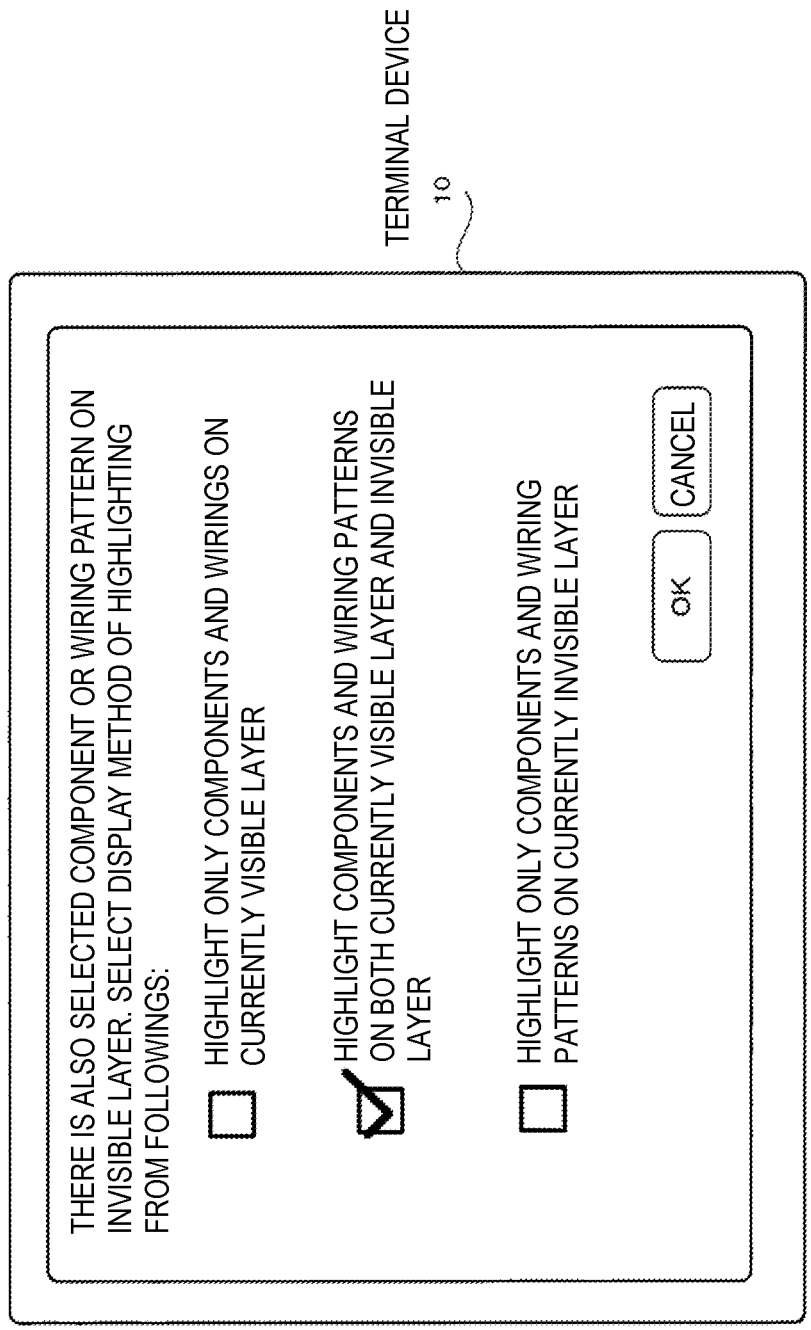
FIG. 14 is a diagram illustrating an example of a display screen of the terminal device 10 when receiving a selection of a method to displaying an object to be displayed from a user.

FIG. 14 illustrates an example of a display screen of the terminal device 10 when receiving the selection of a method of displaying the object to be displayed from the user.

In the display screen example illustrated in FIG. 14, three options, that is, an option of "highlighting only the components and wiring patterns on the currently visible layer", an option of "highlighting both the components and wiring patterns on both the currently visible layer and the invisible layer", and an option of "highlighting only the components and wiring patterns on the currently invisible layer" are presented, the user's selection is received.

Then, in step S107, the display controller 34 switches the highlighting of the components or wiring patterns arranged on the invisible layer based on the received display method.

Figure 15:
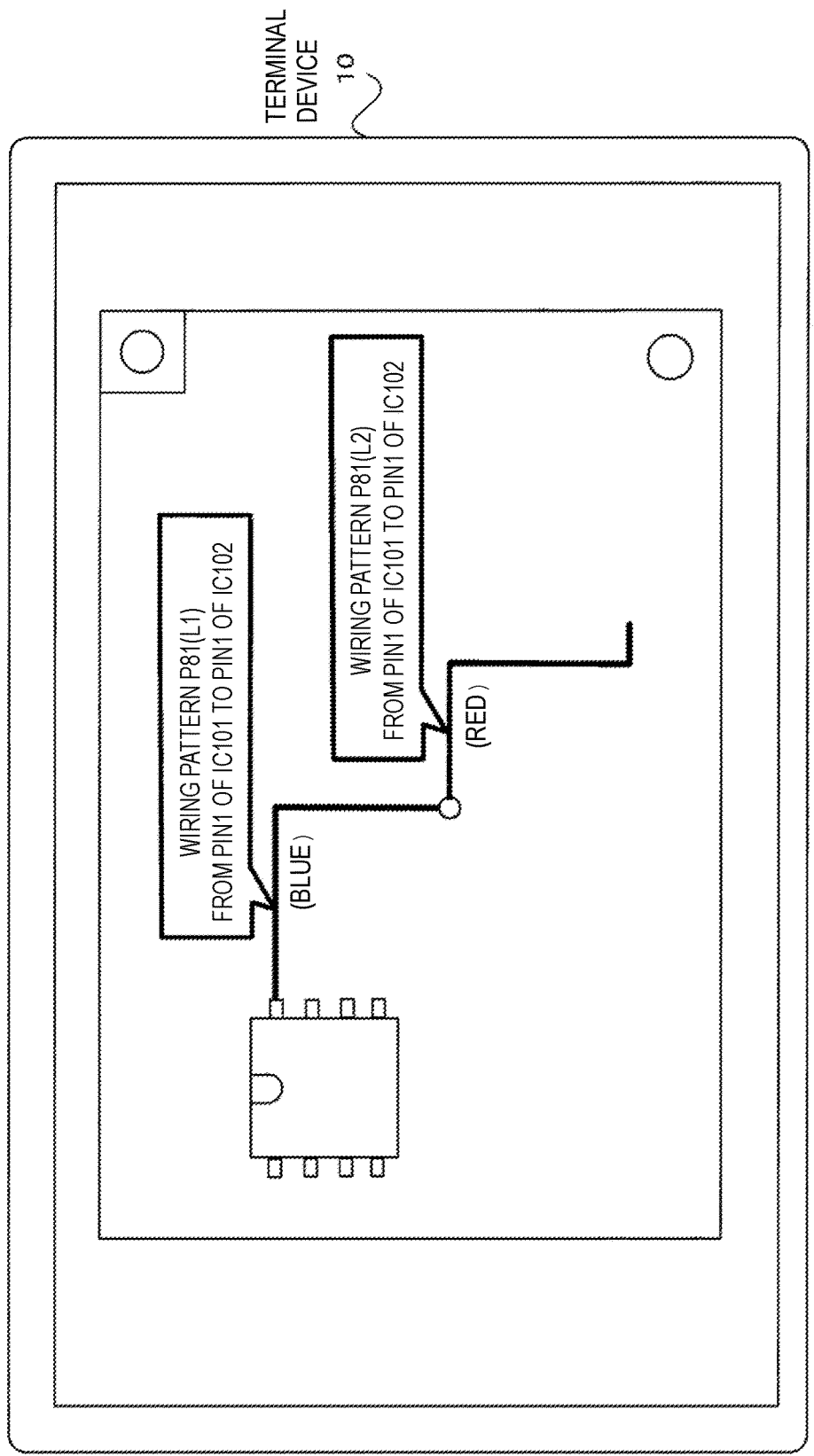
FIG. 15 illustrates an AR display example when the user selects the display method of "highlighting the components and wiring patterns on both the currently visible layer and the invisible layer" as in the example of the display screen illustrated in FIG. 14.

FIG. 15 illustrates an AR display example when the user selects the display method of "highlighting the components and wiring patterns on both the currently visible layer and the invisible layer" as in the example of the display screen illustrated in FIG. 14.

In the AR display example illustrated in FIG. 15, the positions and shapes of both the wiring pattern P81(L1) arranged in the first layer, which is a visible layer, and the wiring pattern P81(L2) arranged in the second layer, which is an invisible layer, are highlighted, and the related information of the two wiring patterns P81(L1) and P81(L2) is displayed in the AR manner.

In FIG. 15, the wiring pattern P81(L1) arranged in the first layer, which is a visible layer, is highlighted in blue, and the wiring pattern P81(L2) arranged in the second layer, which is an invisible layer, is highlighted in red.

Figure 16:
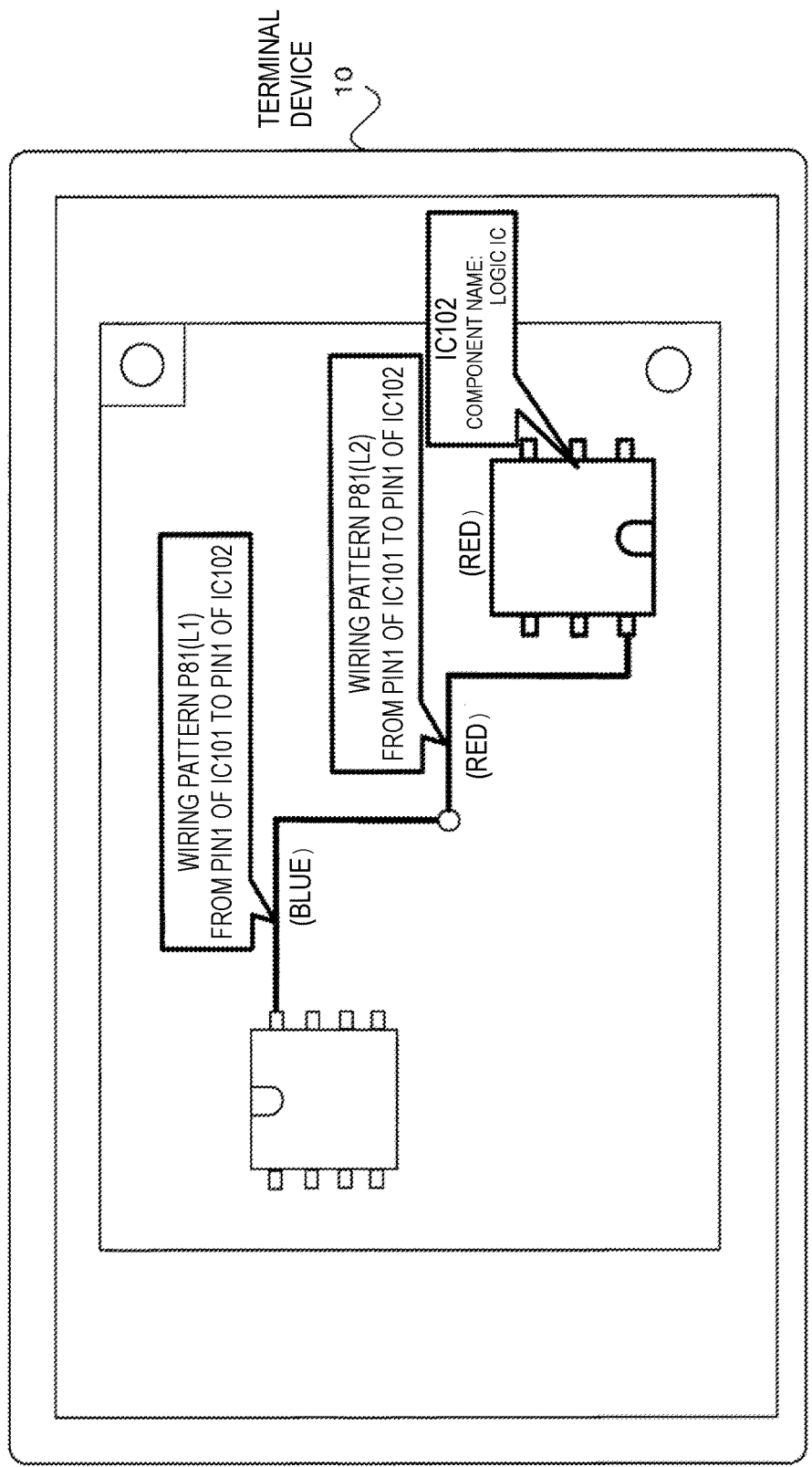
FIG. 16 is a diagram illustrating an AR display example when both a wiring pattern P81 and a component IC102 are designated as objects to be displayed in the AR manner.

While FIG. 15 illustrates the example of the display screen when only the wiring pattern P81 is designated as the object to be displayed for AR display. FIG. 16 illustrates an AR display example when both the wiring pattern P81 and the component IC102 are designated as the object to be displayed in the AR manner.

With reference to FIG. 16, it may be seen that the component IC102 is displayed in the AR manner in addition to the wiring pattern P81 being displayed in the AR manner. Specifically, it may be seen that the component IC102 is highlighted in red, and the related information such as the component number and component name of the component IC102 is superimposed and displayed on the image of the printed wiring board 30.

Figure 17:
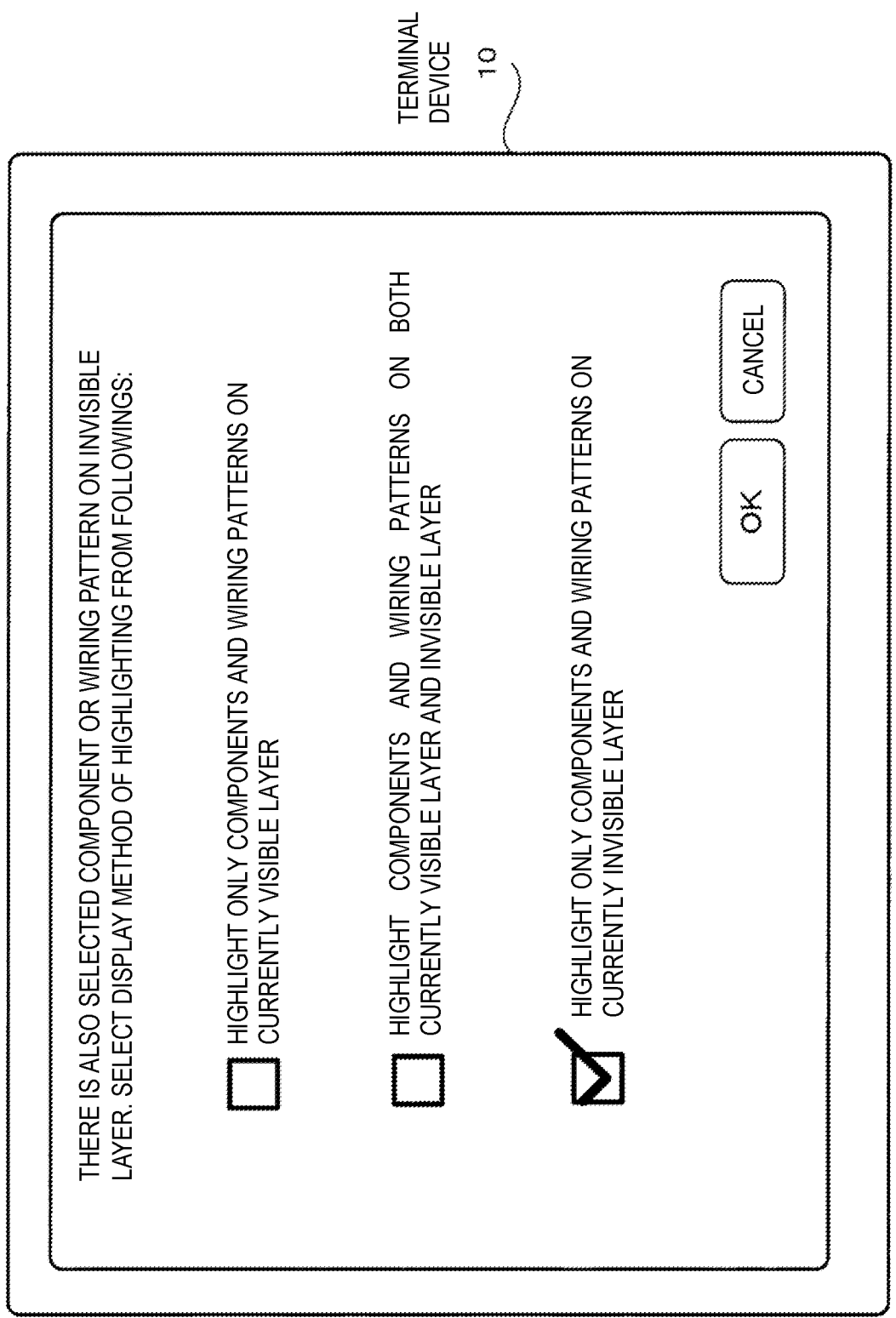
FIG. 17 is a diagram illustrating an example of a display screen when the user selects the option of "highlighting only the components and wiring patterns on the currently invisible layer" as the method of displaying the object to be displayed.
Figure 18:
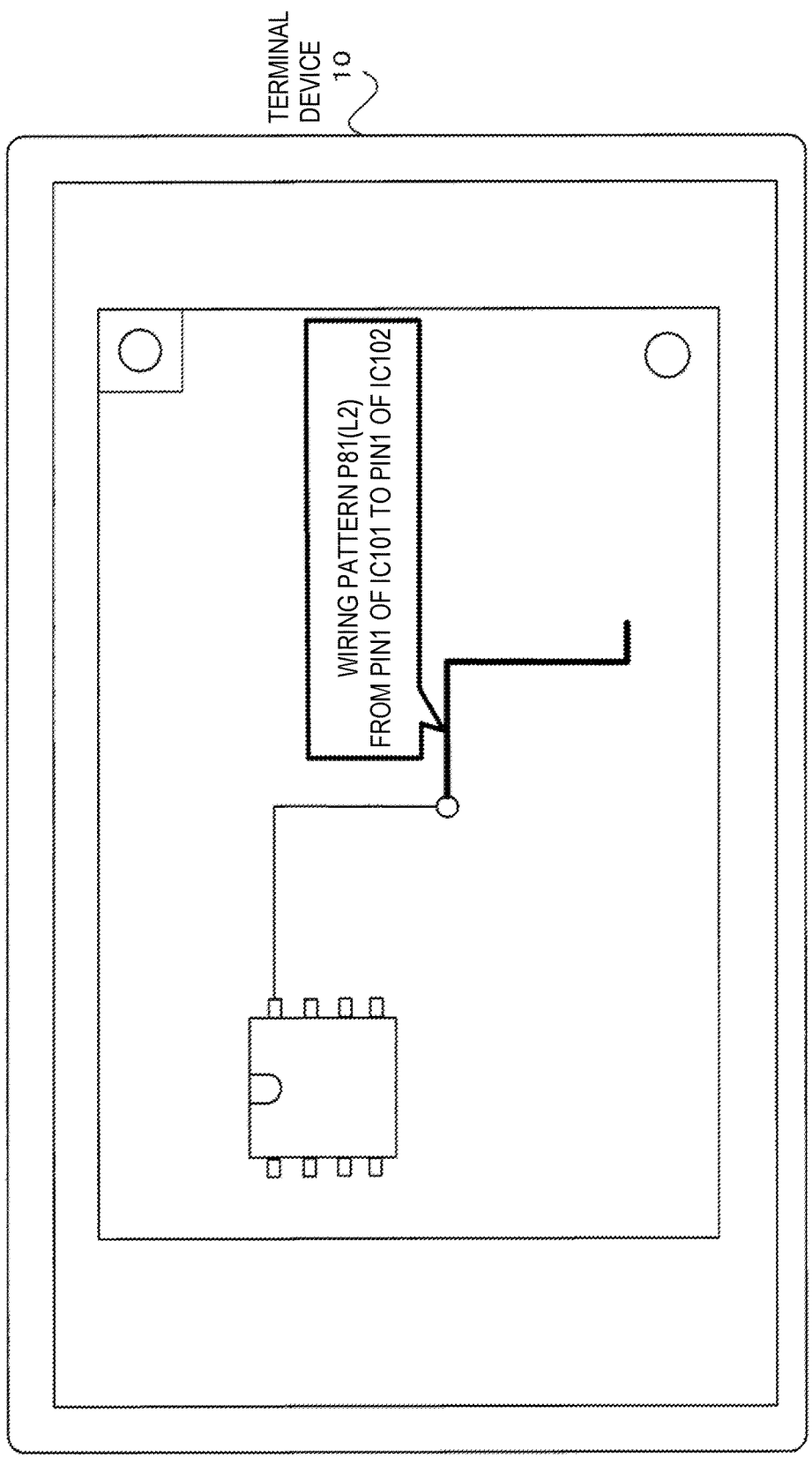
FIG. 18 is a diagram illustrating an AR display example when the user selects the option of "highlighting only the components and wiring patterns on the currently invisible layer" as the method of displaying the object to be displayed.

Further, FIG. 18 illustrates an AR display example when the user selects the option of "highlighting only the components and wiring patterns on the currently invisible layer" (as illustrated in FIG. 17) as the method of displaying the object to be displayed.

In FIG. 18, it may be seen that the wiring pattern P81(L1) arranged on the first layer, which is the currently visible layer, is not highlighted and only the wiring pattern P81(L2) arranged on the second layer, which is the currently invisible layer, is highlighted.

The user selects an object to be displayed in the AR manner on the screen for selecting a display method as illustrated in FIGS. 14 and 17, so that the user may switch among (i) displaying only the object to be displayed arranged in the visible layer in the AR manner, (ii) displaying only the object to be displayed arranged in the invisible layer in the AR manner, and (iii) displaying both the object to be displayed arranged in the visible layer and the object to be displayed arranged in the invisible layer in the AR manner.

In the embodiments above, the term "processor" refers to hardware in a broad sense. Examples of the processor include general processors (e.g., CPU: Central Processing Unit) and dedicated processors (e.g., GPU: Graphics Processing Unit, ASIC: Application Specific Integrated Circuit, FPGA: Field Programmable Gate Array, and programmable logic device).

In the embodiments above, the term "processor" is broad enough to encompass one processor or plural processors in collaboration which are located physically apart from each other but may work cooperatively. The order of operations of the processor is not limited to one described in the embodiments above, and may be changed.

The foregoing description of the exemplary embodiments of the present disclosure has been provided for the purposes of illustration and description. It is not intended to be exhaustive or to limit the disclosure to the precise forms disclosed. Obviously, many modifications and variations will be apparent to practitioners skilled in the art. The embodiments were chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. An information processing apparatus comprising:
   a processor configured to:
      display information related to a part of a printed wiring board superimposed on a captured image of a currently visible wiring layer of the printed wiring board,
      the part of the printed wiring board being a designated wiring of a plurality of wirings arranged on the printed wiring board that is arranged in an invisible wiring layer of the printed wiring board different from the currently visible wiring layer of the printed wiring board, and
      the displayed information including connection information of the designated wiring indicating other parts of the printed wiring board that the designated wiring is connected to, wherein:
   the currently visible wiring layer of the printed wiring board includes a marker, the marker specifying a reference position and including identification information, the identification information specifying a type of the printed wiring board and a surface of the printed wiring board, and
   the processor displays the information superimposed on the captured image at a location relative to the reference position and based on the identification information obtained from the marker.

2. The information processing apparatus according to claim 1, wherein
   the processor is configured to include in the displayed information, information indicating a shape and position of the part of the designated wiring, at the position thereof as if a wiring on the currently visible wiring layer is transparent.

3. The information processing apparatus according to claim 2, wherein
   the processor is configured to, when receiving, from a user, a designation of the designated wiring whose related information is to be displayed on the captured image of the printed wiring board,
      display selectable options including
         (i) an option of displaying, as part of the displayed information, information related to both (a) a wiring arranged in the visible wiring layer and (b) the designated wiring arranged in the invisible wiring layer, and
         (ii) an option of displaying, as part of the displayed information, only the information related to the designated wiring arranged in the invisible wiring layer, and
      switch the wiring whose related information is to be displayed, as part of the displayed information, on the captured image of the printed wiring board in accordance with an option selected by the user.

4. The information processing apparatus according to claim 3, wherein
the processor is configured to, when superimposing and displaying, on the captured image of the printed wiring board, the information related to the wiring arranged in the visible wiring layer, display the information related to the wiring arranged in the visible wiring layer in a display mode different from a mode in which the information related to the designated wiring arranged in the invisible wiring layer is displayed.

5. The information processing apparatus according to claim 4, wherein
the processor is configured to display (i) the information related to the arranged in the visible wiring layer and (ii) the information related to the designated wiring arranged in the invisible wiring layer, in different colors.

6. The information processing apparatus according to claim 3, wherein
wiring layers include the visible wiring layer and the invisible wiring layer, and
the processor is configured to, when superimposing and displaying, on the captured image of the printed wiring board, the information related to the designated wiring arranged in the invisible wiring layer, display, as part of the displayed information, information related to a wiring arranged in one of the wiring layers and information related to a wiring arranged in another one of the wiring layers in different display modes from each other.

7. The information processing apparatus according to claim 1, wherein
the processor is configured to, when receiving, from a user, a designation of the wiring whose related information is to be displayed on the captured image of the printed wiring board,
display selectable options including
(i) an option of displaying, as part of the displayed information, information related to both (a) a wiring arranged in the visible wiring layer and (b) the designated wiring arranged in the invisible wiring layer, and
(ii) an option of displaying, as part of the displayed information, only the information related to the designated wiring arranged in the invisible wiring layer, and
switch the wiring whose related information is to be displayed, as part of the displayed information, on the captured image of the printed wiring board in accordance with an option selected by the user.

8. The information processing apparatus according to claim 7, wherein
the processor is configured to, when superimposing and displaying, on the captured image of the printed wiring board, the information related to the wiring arranged in the visible wiring layer, display the information related to the wiring arranged in the visible wiring layer in a display mode different from a mode in which the information related to the designated wiring arranged in the invisible wiring layer is displayed.

9. The information processing apparatus according to claim 8, wherein
the processor is configured to display (i) the information related to the wiring arranged in the visible wiring layer and (ii) the information related to the designated wiring arranged in the invisible wiring layer, in different colors.

10. The information processing apparatus according to claim 7, wherein
wiring layers include the visible wiring layer and the invisible wiring layer, and
the processor is configured to, when superimposing and displaying, on the captured image of the printed wiring board, the information related to the designated wiring arranged in the invisible wiring layer, display, as part of the displayed information, information related to a wiring arranged in one of the wiring layers and information related to a wiring arranged in another one of the wiring layers in different display modes from each other.

11. A non-transitory computer readable medium storing a program that causes a computer to execute information processing, the information processing comprising:
displaying information related to a part of a printed wiring board superimposed on a captured image of a currently visible wiring layer of the printed wiring board,
the part of the printed wiring board being a designated wiring of a plurality of wirings arranged on the printed wiring board that is arranged in an invisible wiring layer of the printed wiring board different from the currently visible wiring layer of the printed wiring board, and
the displayed information including connection information of the designated wiring indicating other parts of the printed wiring board that the designated wiring is connected to, wherein
the currently visible wiring layer of the printed wiring board includes a marker, the marker specifying a reference position and including identification information, the identification information specifying a type of the printed wiring board and a surface of the printed wiring board, and
the displaying of the information includes displaying the information superimposed on the captured image at a location relative to the reference position and based on the identification information obtained from the marker.

12. An information processing apparatus comprising:
means for displaying information related to a part of a printed wiring board superimposed on a captured image of a currently visible wiring layer of the printed wiring board,
the part of the printed wiring board being a designated wiring of a plurality of wirings arranged on the printed wiring board that is arranged in an invisible wiring layer of the printed wiring board different from the currently visible wiring layer of the printed wiring board, and
the displayed information including connection information of the designated wiring indicating other parts of the printed wiring board that the designated wiring is connected to, wherein
the currently visible wiring layer of the printed wiring board includes a marker, the marker specifying a reference position and including identification information, the identification information specifying a type of the printed wiring board and a surface of the printed wiring board, and
the means for displaying displays the information superimposed on the captured image at a location relative to the reference position and based on the identification information obtained from the marker.

* * * * *